United States Patent
Tkachov et al.

(10) Patent No.: US 8,391,191 B2
(45) Date of Patent: Mar. 5, 2013

(54) SYSTEM AND METHOD FOR THE APPLICATION ON AN LMS METHOD TO UPDATING AN ECHO CANCELLER IN AN ADSL MODEM

(75) Inventors: Igor Tkachov, Arlington, MA (US); Stuart Sandberg, Arlington, MA (US)

(73) Assignee: TQ Delta, LLC, Austin, TX (US)

( * ) Notice: Subject to any disclaimer, the term of this patent is extended or adjusted under 35 U.S.C. 154(b) by 4 days.

(21) Appl. No.: 12/783,740

(22) Filed: May 20, 2010

(65) Prior Publication Data

US 2010/0296663 A1 Nov. 25, 2010

Related U.S. Application Data

(63) Continuation of application No. 11/430,251, filed on May 9, 2006, now abandoned, which is a continuation of application No. 11/058,289, filed on Feb. 16, 2005, now abandoned, which is a continuation of application No. 09/768,275, filed on Jan. 25, 2001, now abandoned.

(60) Provisional application No. 60/177,944, filed on Jan. 25, 2000.

(51) Int. Cl.
*H04B 3/20* (2006.01)
*H04J 11/00* (2006.01)

(52) U.S. Cl. ........................ 370/292; 370/208

(58) Field of Classification Search .................. 370/277, 370/279, 282, 286, 289, 203, 208–210, 292, 370/290
See application file for complete search history.

(56) References Cited

U.S. PATENT DOCUMENTS 4,852,161 A 7/1989 Hagiwara
(Continued)

FOREIGN PATENT DOCUMENTS

EP 0351843 1/1990
(Continued)

OTHER PUBLICATIONS

U.S. Appl. No. 12/783,744, filed May 20, 2010, Sandberg et al.
(Continued)

*Primary Examiner* — Hanh N Nguyen
(74) *Attorney, Agent, or Firm* — Jason H. Vick; Sheridan Ross, PC

(57) ABSTRACT

An echo cancellation device relies on the known characteristics of the sync frame to monitor, update in an off-line fashion and determine the accuracy of an echo canceller in, for example, a modem, such as an ADSL modem. Specifically, time domain samples are read from the transmit (Tx) and receive (Rx) paths of the modem. These samples are stored in memory. When the sync frame has received a predetermined number of the same Tx samples and Rx samples, the samples are stored. Running averages, over the sync frames, of the TX and RX samples are maintained. These averages are subtracted from a sync frame of samples, to allow LMS updating of the echo canceller taps, free of extraneous signals. Updating, i.e., tracking of changes in the echo channel, is done for the echo canceller in an off-line fashion. The coefficients for the in-line version are updated, while the off-line version is updated over several sync frames. Periodically, the performance of the off-line version is compared with the in-line version. The coefficients of the in-line version are replaced by those of the off-line version only if it is determined the off-line version, which is tracking echo channel changes, has better performance. After replacement of the in-line coefficients, the off-line tracking is continued in the off-line version.

10 Claims, 3 Drawing Sheets

U.S. PATENT DOCUMENTS

| | | | |
|---|---|---|---|
| 5,007,047 | A | 4/1991 | Sridhar et al. |
| 5,097,488 | A | 3/1992 | Kokubo et al. |
| 5,305,309 | A | 4/1994 | Chujo et al. |
| 5,414,813 | A | 5/1995 | Shiobara |
| 5,577,097 | A | 11/1996 | Meek |
| 5,621,724 | A | 4/1997 | Yoshida |
| 5,633,936 | A | 5/1997 | Oh |
| 5,737,410 | A | 4/1998 | Vahatalo et al. |
| 5,812,944 | A * | 9/1998 | Matsumoto ............... 455/403 |
| 5,828,696 | A | 10/1998 | Gelblum et al. |
| 5,937,060 | A | 8/1999 | Oh |
| 6,185,300 | B1 | 2/2001 | Romesburg |
| 6,366,591 | B1 * | 4/2002 | Lai ........................... 370/523 |
| 6,377,683 | B1 * | 4/2002 | Dobson et al. ........ 379/406.12 |
| 6,580,696 | B1 | 6/2003 | Chen et al. |
| 6,654,463 | B1 | 11/2003 | Leonidov et al. |
| 6,683,859 | B1 * | 1/2004 | Molnar et al. ............. 370/286 |
| 6,771,772 | B1 | 8/2004 | Tanrikulu |
| 2001/0040875 | A1 | 11/2001 | Tkachov et al. |
| 2005/0141441 | A1 | 6/2005 | Tkachov et al. |
| 2006/0215587 | A1 | 9/2006 | Tkachov et al. |

FOREIGN PATENT DOCUMENTS

| | | |
|---|---|---|
| EP | 0557829 | 9/1993 |
| JP | A-1992 Hei04-119713 | 4/1992 |
| JP | A-1996 Hei08-125587 | 5/1996 |
| JP | A-1998 Hei10-303872 | 11/1998 |
| JP | A-1999 Hei11-514516 | 12/1999 |
| KR | 0089397 | 5/1995 |
| KR | 1998-24330 | 7/1998 |
| WO | WO 97/15124 | 4/1997 |
| WO | WO 98/51066 | 11/1998 |
| WO | WO 99/26400 | 5/1999 |

OTHER PUBLICATIONS

International Search Report for International (PCT) Patent Application No. PCT/US01/02341, dated May 28, 2001, 4 pages.
Written Opinion for International (PCT) Patent Application No. PCT/US01/02341, dated Jan. 29, 2002, 6 pages.
International Preliminary Examination Report for International (PCT) Patent Application No. PCT/US01/02341, dated Apr. 18, 2002, 5 pages.
Official Action for Canadian Patent Application No. 2,396,162, mailed Jun. 16, 2008.
Official Action for European Patent Application No. 01905022.8, dated Sep. 6, 2004.
Official Action for European Patent Application No. 01905022.8, dated Mar. 17, 2006.
Preliminary Rejection (including translation) for Korean Patent Application No. 10-2002-7009465, issued Aug. 21, 2007.
Office Action (including English translation) for Korean Patent Application No. 10-2010-7006184, mailed Jun. 15, 2010.
European Search Report and Opinion for European Patent Application No. 08015818.1, dated Oct. 22, 2008.
Official Action for European Patent Application No. 08015818.1, dated Jul. 24, 2009.
Official Action (including English translation) for Japanese Patent Application No. 2001-555226, mailed Aug. 9, 2010.
Official Action for U.S. Appl. No. 09/768,275, mailed Jul. 21, 2004.
Official Action for U.S. Appl. No. 09/768,275, mailed Jun. 22, 2005.
Official Action for U.S. Appl. No. 11/058,289, mailed May 27, 2005.
Official Action for U.S. Appl. No. 11/058,289, mailed Nov. 9, 2005.
Official Action for U.S. Appl. No. 11/430,251, mailed Oct. 19, 2007.
Official Action for U.S. Appl. No. 11/430,251, mailed Aug. 6, 2008.
Official Action for U.S. Appl. No. 11/430,251, mailed Jan. 7, 2009.
Official Action for U.S. Appl. No. 11/430,251, mailed Sep. 11, 2009.
Official Action for U.S. Appl. No. 11/430,251, mailed Jun. 10, 2010.
Official Action for Korean Patent Application No. 10-2010-7006184, mailed Jun. 28, 2011.
Decision of Final Rejection for Japanese Patent Application No. 2001-555226, mailed Apr. 11, 2011.
Notice of Refusal for Korean Patent Application No. 10-2002-7009465, dated May 31, 2011.
Notice of Refusal Decision for Korean Patent Application No. 10-2010-7006184, mailed Aug. 31, 2011.
European Search Report for European Patent Application No. 10011999.9, mailed Sep. 6, 2012.
Official Action for Canadian Patent Application No. 2,396,162, mailed Oct. 25, 2010.
Official Action (including translation) for Korean Patent Application No. 10-2002-7009465, mailed Sep. 30, 2010.
Examiner's Report for Australian Application No. 32943/01, mailed Feb. 19, 2004.
Notice of Acceptance for Australian Patent Application No. 32943/01, mailed Sep. 23, 2005.
Communication Under Rule 71(3) EPC, mailed Apr. 8, 2008.
Decision to Grant a European Patent Pursuant to Article 97(1) EPC, mailed Aug. 21, 2008.

* cited by examiner

SYSTEM AND METHOD FOR THE APPLICATION ON AN LMS METHOD TO UPDATING AN ECHO CANCELLER IN AN ADSL MODEM

RELATED APPLICATION DATA

This application is a Continuation of U.S. application Ser. No. 11/430,251 filed May 9, 2006, now abandoned which is a Continuation of U.S. application 11/058,289, filed Feb. 16, 2005, now abandoned which is a Continuation of U.S. application Ser. No. 09/768,275, filed Jan. 25, 2001, now abandoned which claims the benefit of and priority under 35 U.S.C. §119(e) to U.S. patent application Ser. No. 60/177,944, filed Jan. 25, 2000, entitled "Application of LMS Method to Updating Echo Canceller Coefficients in ADSL Modem," each of which are incorporated herein by reference in their entirety.

FIELD OF THE INVENTION

This invention relates to a telecommunications environment. In particular, this invention relates to reducing echo in a telecommunications environment.

BACKGROUND OF THE INVENTION

In DSL technology, communications over the local subscriber loop between the central office and the subscriber premises is accomplished by modulating the data to be transmitted into a multiplicity of discrete frequency carriers which are summed together and then transmitted over the subscriber loop. Individually, the carriers form discrete, non-overlapping communication subchannels of limited bandwidth; collectively, they form what is effectively a broadband communications channel. At the receiver end, the carriers are demodulated and the data recovered.

The data symbols that are transmitted over each subchannel carry a number of bits that may vary from subchannel to subchannel, depending on the signal-to-noise ratio (SNR) of the subchannel. The number of bits that can be accommodated under specified communication conditions is known as the "bit allocation" of the subchannel, and is determined for each subchannel in a known manner as a function of the measured SNR of the subchannel and the bit error rate associated with it.

The SNR of the respective subchannels is determined by transmitting a reference signal over the various subchannels and measuring the SNR's of the received signals. The loading information is typically determined at the receiver, or "local" end of the subscriber line, e.g., at the subscriber premises, in the case of transmission from the central office to the subscriber, and at the central office in the case of transmission from the subscriber premises to the central office, and is communicated to the other "transmitting," or remote end, so that each transmitter-receiver pair in communication with each other uses the same information for communication. The bit allocation information is stored at both ends of the communication pair link for use in defining the number of bits to be used on the respective subchannels in transmitting data to a particular receiver. Other subchannel parameters such as subchannel gains, time and frequency domain equalizer coefficients and other characteristics may also be stored to aid in defining the subchannel.

Information may, of course, be transmitted in either direction over the subscriber line. For many applications, such as the delivery of video, Internet services, etc., to a subscriber, the required bandwidth from the central office to the subscriber is many times that of the required bandwidth from the subscriber to the central office. One recently developed service providing such a capability is based on discrete multitone asymmetric digital subscriber line (DTM ADSL) technology. In one form of this service, up to 256 subchannels, each of 4312.5 Hz bandwidth, are devoted to downstream, from central office to subscriber premises, communications, while up to 32 subchannels, each also of 4312.5 Hz bandwidth, provide upstream, from subscriber premises to central office, communications. Communication is by way of frames of data and control information. In a presently used form of ADSL communication, 68 data frames and one syncronization frame form a superframe that is repeated throughout the transmission. The data frames carry the data that is to be transmitted and the syncronization frame, or sync frame, provides a known bit sequence that is used to syncronize the transmitting and receiving modems and that also facilitates determination of transmission subchannel characteristics such as signal-to-noise ration (SNR), and the like.

In providing upstream and downstream channels, ADSL modems divide the available bandwidth of the subscriber loop in one of two ways, frequency-division multiplexing (FDM) or echo cancellation. Frequency division multiplexing assigns one set of subcarriers for upstream data and a different set of subcarriers for downstream data. The downstream path is then divided by time-division multiplexing into one or more high-speed channels and one or more low-speed channels. The upstream path is also multiplexed into corresponding low-speed channels.

Echo cancellation assigns the upstream band to overlap the downstream, and separates the two by means of local echo cancellation, a technique well known in V.32 and V.34 modems. With either technique, ADSL splits off a 4 kHz region for basic telephone service at the DC end of the band.

SUMMARY OF THE INVENTION

The systems and methods of this invention rely on the known characteristics of the sync frame to monitor, update in an off-line fashion and determine the accuracy of an echo canceller in, for example, a modem, such as an ADSL modem. Specifically, time domain samples are read from the transmit (Tx) and receive (Rx) paths of the modem. These samples are stored in memory, such as registers. When the sync frame has received a predetermined number of the same Tx samples and Rx samples, the samples are stored into an array. Running averages, over the sync frames, of the TX and RX samples are maintained. These averages are subtracted from a sync frame of samples, to allow LMS updating of the echo canceller taps, free of extraneous signals.

Updating, i.e., tracking of changes in the echo channel, is done for the echo canceller in an off-line fashion. The coefficients for the in-line version are updated, while the off-line version is updated over several sync frames. Periodically, the performance of the off-line version is compared with the in-line version. The coefficients of the in-line version are replaced by those of the off-line version only if it is determined the off-line version, which is tracking echo channel changes, has better performance. After replacement of the in-line coefficients, the off-line tracking is continued in the off-line version.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
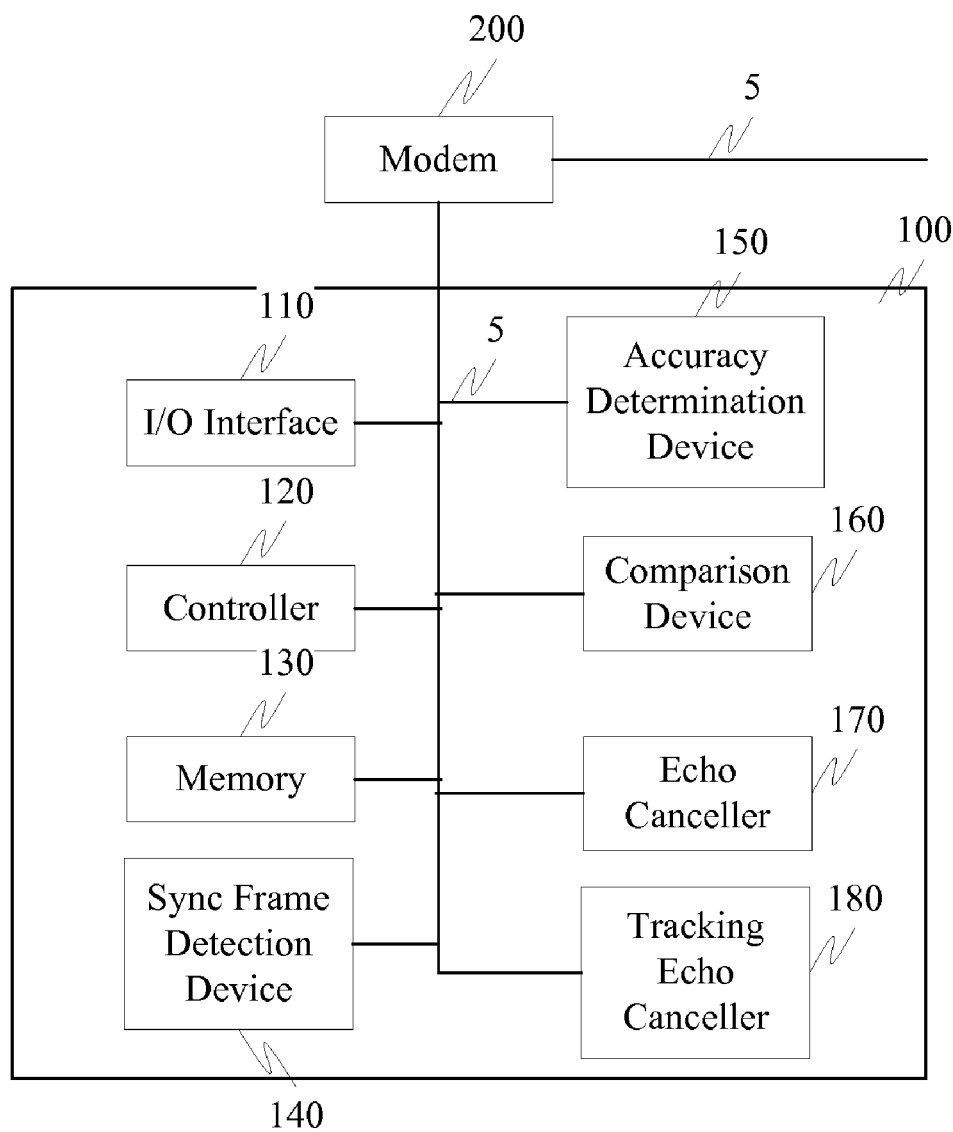
FIG. 1 is a functional block diagram illustrating an exemplary echo canceller according to this invention.

The exemplary embodiments of this invention will be described in relation to the application of the invention to an ADSL transceiver environment. However, it should be appreciated that in general the systems and methods of this invention will work equally well for any telecommunications environment having a known extraneous signal.

An exemplary digital echo canceller is realized as a 192 tap long finite impulse response (FIR) filter. However, it is to be appreciated that the system and methods of this invention will work equally well with any echo cancellation type filter or device.

The echo canceller serves to remove echo from the received sequence by subtracting an estimate of the transmitter signal (Tx) from the received signal (Rx). This results in a received signal without echo (Rx') in accordance with:

$$Rx'_n = Rx - \text{Echo}_{estimate} = Rx_n - \sum_k \text{Taps}_k \cdot Tx_{n-k}$$

Where $Rx_n$ is the nth received sample, $Tx_n$ is the nth transmitted sample, and $\text{Taps}_k$ is the kth digital echo canceller (DEC) tap. The echo free sequence $Rx'_n$ is then passed along for further non-DEC related processing.

The initial settings for the taps are obtained during an initialization stage of the modem by using an impulse. For example, a single unity sample can be transmitted, and the echo directly measured therefrom.

During showtime, the taps can be trained and/or updated based on a least mean squares (LMS) algorithm. For LMS, in general, if $\omega_j$ are the coefficients of an N-taps adaptive FIR filter, $x_i$ is the ith input signal sample and $y_i$, is the ith filter output sample, these are related as:

$$y_i = \Sigma \omega_j \cdot x_{i-j}$$

The LMS algorithm for updating (adapting) the coefficients of the adaptive filter can be represented as:

$$\omega_k(n+1) = \omega_k(n) + \mu \cdot \epsilon_n \cdot x_{n-k} \quad k=0 \ldots N \epsilon_n = a_n - y_n$$

Where $a_n$ is the desired filter output for sample n, $w_k(n)$ are the filter coefficients used to produce the filter output sample n and $w_k(n+1)$ are the updated coefficients to be used to produce the (n+1)th output sample. This formula can be rewritten in vector form as:

$$\overline{\omega}_{n+1} = \overline{\omega}_n + \mu \cdot \varepsilon_n \cdot \overline{x}_n$$

$$\begin{pmatrix} \varpi_1 \\ \varpi_2 \\ \ldots \\ \varpi_N \end{pmatrix}_{n+1} = \begin{pmatrix} \varpi_1 \\ \varpi_2 \\ \ldots \\ \varpi_N \end{pmatrix}_n + \mu \cdot \varepsilon_n \cdot \begin{pmatrix} x_n \\ x_{n-1} \\ \ldots \\ x_{n-N} \end{pmatrix}$$

Now applying this to the case of an adaptive digital echo canceller, the input signal x is the transmitted signal Tx, ω is the taps of the filter and y is an estimate of the echo.

ω=Taps
x=Tx
y=Echo$_{estimated}$ $$\text{Echo}_{estimated} = \sum_{k=0}^{191} \text{Taps}_k \cdot Tx_{n-k}$$

In order to determine the error, $\epsilon$, the estimated echo is subtracted from the measured echo in accordance with:

$$\epsilon = \text{Echo}_{measured} - \text{Echo}_{estimated},$$

where it is seen that $\text{Echo}_{measured}$ is the desired response, a, from above. The reception $Rx_n$ however will contain not only the echo, but also a strong far end signal component, and so unmodified, it is not a good choice for $\text{Echo}_{measured}$. The far end component should be removed from $Rx_n$ before using it as $\text{Echo}_{measured}$, to give best performance of LMS. It is removed by exploiting the fact that for ADSL, the far end signal will be known for each sync frame. An estimate of its contribution in $Rx_n$ is thus obtained via an average, over sync frames, $\langle Rx_n \rangle$ of the reception. Therefore, the desired DEC output is formed according to:

$$\text{Echo}_{measured,n} = Rx_n - \langle Rx \rangle$$

The resulting equation for the updating of the coefficients of echo canceller is:

$$\overrightarrow{Taps_{n+1}} = \overrightarrow{Taps_n} + \mu \cdot \overrightarrow{Tx} \cdot (\text{Echo}_{measured} - \text{Echo}_{estimated})$$

$$= \overrightarrow{Taps_n^T} + \mu \cdot \overrightarrow{Tx} \cdot \left( Rxn - \langle Rx \rangle - \overrightarrow{Taps_n^T} \cdot \overrightarrow{Tx} \right)$$

where μ is the LMS step size, which governs convergence speed, excess coefficient error. The LMS coefficient μ is implemented as a right shift of the Tx*error. Thus, the algorithm for updating the digital echo canceller taps is:

$$\overrightarrow{Taps_{n+1}} = \overrightarrow{Taps_n} + \overrightarrow{Tx} \cdot \left( Rxn - \langle Rx \rangle - \overrightarrow{Taps_n^T} \cdot \overrightarrow{Tx} \right)$$

If the Tx signal is random, averaging of the reception $\langle Rx \rangle$ over several sync frames will leave only the contribution of the far-end (periodic) sync frame signal, as intended. However, the Tx signal may contain a pilot tone component which would then also have contribution in $\langle Rx \rangle$. Therefore, when $\langle Rx \rangle$ is subtracted from Rx, the pilot component of the echo is removed. If not modified, the update algorithm above takes the form in the presence of a Tx pilot as:

$$\overrightarrow{Taps_{n+1}} = \overrightarrow{Taps_n} + \left[ \overrightarrow{Tx} - \text{Pilot} \right]$$

$$\left( \frac{\{Rxn + \underline{\text{Pilot\_echo}}\}\langle Rx + \rangle -}{\overrightarrow{Taps_{Tn}^T} \cdot [\overrightarrow{Tx-Pilot}]} \right) \cdot 2^{mu\_shift}(*)$$

If Tx contains a pilot tone component, it is best to subtract it from Tx before applying the update algorithm above. The algorithm then becomes:

$$\overrightarrow{Taps_{n+1}} = \overrightarrow{Taps_n} + \left[\overrightarrow{Tx} - \overrightarrow{Pilot}\right] \left( \frac{Rxn - \langle Rx \rangle - \overrightarrow{Taps_nT} \cdot [\overrightarrow{Tx-Pilot}]}{} \right) \cdot 2^{mu\_shift}(*)$$

In an exemplary embodiment based on the 918 chipset, the 918 chipset provides the capability of reading current time domain samples from the Tx and the Rx path with the use of 'shadow registers.' Registers F4 and F5 in this exemplary embodiment are updated with arriving Tx samples and registers F6 and F7 with Rx samples. When the sync frame is being received, e.g., frame 67 in ADI code, 200 consecutive Tx samples and then 8 consecutive Rx samples are collected in an array $[Tx_1, \ldots, Tx_{200}, RX_0, \ldots, Rx_7]$. Thus, the collected Rx samples are the same samples of the received reference DTM frame, n through n+7.

In particular, the last eight Tx samples can be used to extract the pilot tone from the transmitted signal. These samples are averaged over a large number of frames. The averaged samples of one pilot period $<Tx_{192}, \ldots, Tx_{200}>$ are subtracted from the entire Tx array. For each of the eight Rx samples the echo is determined and subtracted from the signal. These 'echoless' samples are then used to update the average of the Rx signal—$<Rx_0-Rx_7>$.

After the Tx and the Rx data is collected and averages determined, all the necessary digital echo canceller tap update information is available. The difference in propagation delays between the echo and echo estimate leaves the first eight taps of the exemplary echo canceller unused (equal to zero). This makes possible for multiple updates of the echo canceller taps with a single set of data from one sync frame. More updates could be realized if the collection of Tx and Rx samples was performed in parallel.

The error signal is determined in accordance with:

$$\left( Rxn - \langle Rx \rangle - \sum_{k=0}^{192} Taps_n \cdot Tx_{n-k} \right)$$

This signal is useful to monitor the quality of current digital echo canceller taps. Ideally, this error contains only channel noise. An exemplary embodiment of the invention monitors the average of the error, the average of the absolute value of the error and the minimum and the maximum errors.

The exemplary digital adaptive echo canceller can then be coded as a background task in showtime. This exemplary task is active for, for example, 200 superframes, unless interrupted by, for example, frequency domain equation updates. Specifically, the code for the adaptive digital echo canceller algorithm is placed in Swap B. Hardware read functions also reside in Swap B although they are called from code placed in Swap A. This allowed some memory savings. As a result only about 50 words of memory from Swap A are used in this exemplary embodiment.

FIG. 1 illustrates an exemplary echo cancellation device 100 according to an embodiment of this invention. In particular, the echo cancellation device 100 comprises an I/O interface 110, a controller 120, memory 130, a sync frame detection device 140, an accuracy determination device 150, a comparison device 160, an echo canceller 170 and a tracking echo canceller 170, all interconnected by link 5. The echo cancellation device 100 is also connected to a modem 200, such as a CO modem, CPE modem, DSL modem, ADSL modem, or the like, or into one or more additional modems via link 5.

The memory 130 can be any memory device, such as a register, a shadow register, or the like. Furthermore, the links 5 can be a wired or a wireless link or any other known or later developed element(s) that is capable of supplying electronic data to and from the connected elements.

While the exemplary embodiment illustrated in FIG. 1 shows components of the echo cancellation device collocated, it is to be appreciated that the various components of the echo cancellation device 100 can be located at distant portions of a distributed network, such as a local area network, a wide area network, an intranet and/or the Internet, or within a dedicated echo cancellation device. Thus, it should be appreciated that the components of the echo cancellation device 100 can be combined into one device, such as a modem, or collocated on a particular node of a distributed network. As will be appreciated from the following description, and for reasons of computational efficiency, the components of the echo cancellation device 100 can be arranged at any location, such as within a general purpose computer, within a distributed network, integrated into a modem, or linked to a modem, without affecting the operation of the system.

In operation, the modem 200 receives and/or transmits data in the form of frames including a sync frame. As previously discussed, the characteristics of the sync frame are known. The receipt of this sync frame is detected by, with the cooperation of the I/O interface and the controller 120, the sync frame detection device 140. Upon detection of a received sync frame, the echo cancellation device 100 begins path sampling of data within the sync frame. These samples are then stored, with the cooperation of the controller 120 and the I/O interface, in the memory 130. Next, with the aid of the controller 120, the samples stored in the memory 130 are read and a determination is made whether to enter a measurement mode.

If the echo cancellation device 100 is not to enter a measurement mode, the tracking echo canceller 180 is updated with a modified set of coefficients that allow the echo canceling filter to reduce the echo in the signal.

Alternatively, if the echo cancellation device 100 is to enter the measurement mode, the accuracy of the echo canceling filter in both the tracking echo canceller 180 and the echo canceller 170 are determined Specifically, an extraneous signal is subtracted from the received sample signal. Furthermore, an estimate of the echo is subtracted from this extraneous signal. This results in an estimate of the error. The error of the echo canceller 170 and the tracking echo canceller 180 are then compared. If the accuracy of the tracking echo canceller 180 is more accurate than that of the echo canceller 170, the echo canceller 170 is updated by downloading, for example from memory 130, new coefficients for the echo cancellation filter.

However, if the echo canceller 170 is more accurate than the tracking echo canceller 180, the coefficients of the echo cancellation filter are unchanged and monitoring of the echo and the received signal continues.

Figure 2:
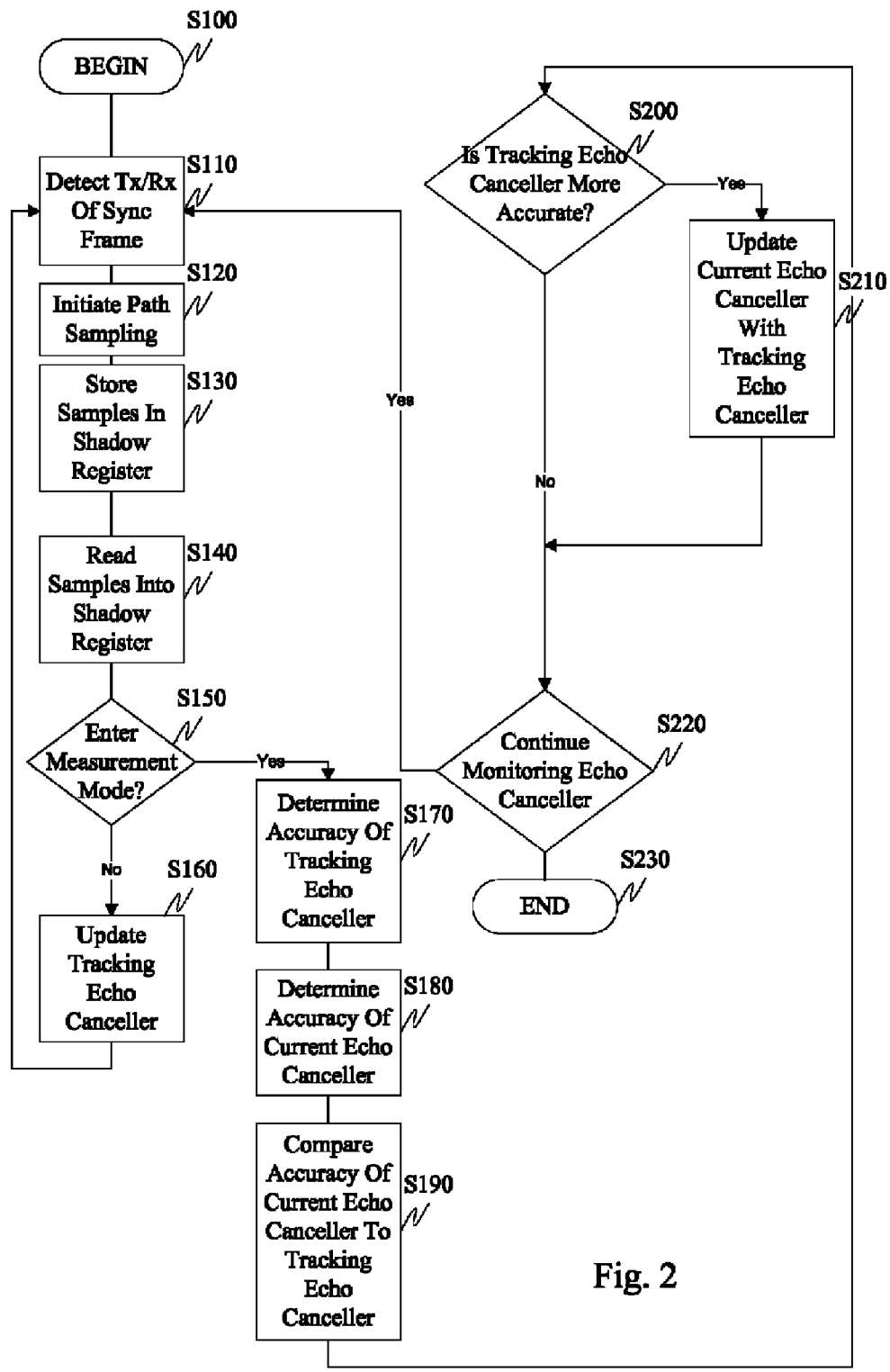
FIG. 2 is a flowchart outlining an exemplary method for monitoring and updating an echo canceller according to this invention.

FIG. 2 illustrates an exemplary method for determining and updating an echo canceller in accordance with one embodiment of the invention. In particular, control begins in step S100 and continues to step S110. In step S110, a transmitted and/or received sync frame is detected. Next, in step S120, path sampling is initiated. Then, in step S130, the samples are stored in memory. Control then continues to step S140.

In step S140, the samples are read into memory. Next, in step S150, a determination is made whether to enter a measurement mode. If a measurement mode is to be entered, control continues to step S170, otherwise, control jumps to step S160.

In step S160, the tracking echo canceller is updated and control returns to step S110.

In step S170, the accuracy of the tracking echo canceller is determined. Next, in step S180, the accuracy of the current echo canceller is determined. Then, in step S190 the accuracy of the current echo canceller is compared to the tracking echo canceller. Control then continues to step S200.

In step S200, a determination is made whether the tracking echo canceller is more accurate than the current echo canceller. If the tracking echo canceller is more accurate, control continues to step S210. Otherwise, control jumps to step S220.

In step S210, the current echo canceller is updated with the echo canceller filter coefficients of the tracking echo canceller. Control then continues to step S220.

In step S220, a determination is made whether to continue monitoring the performance of the echo canceller. If continued monitoring is desired, control returns to step S110. Otherwise control continues to step S230 where the control sequence ends.

Figure 3:
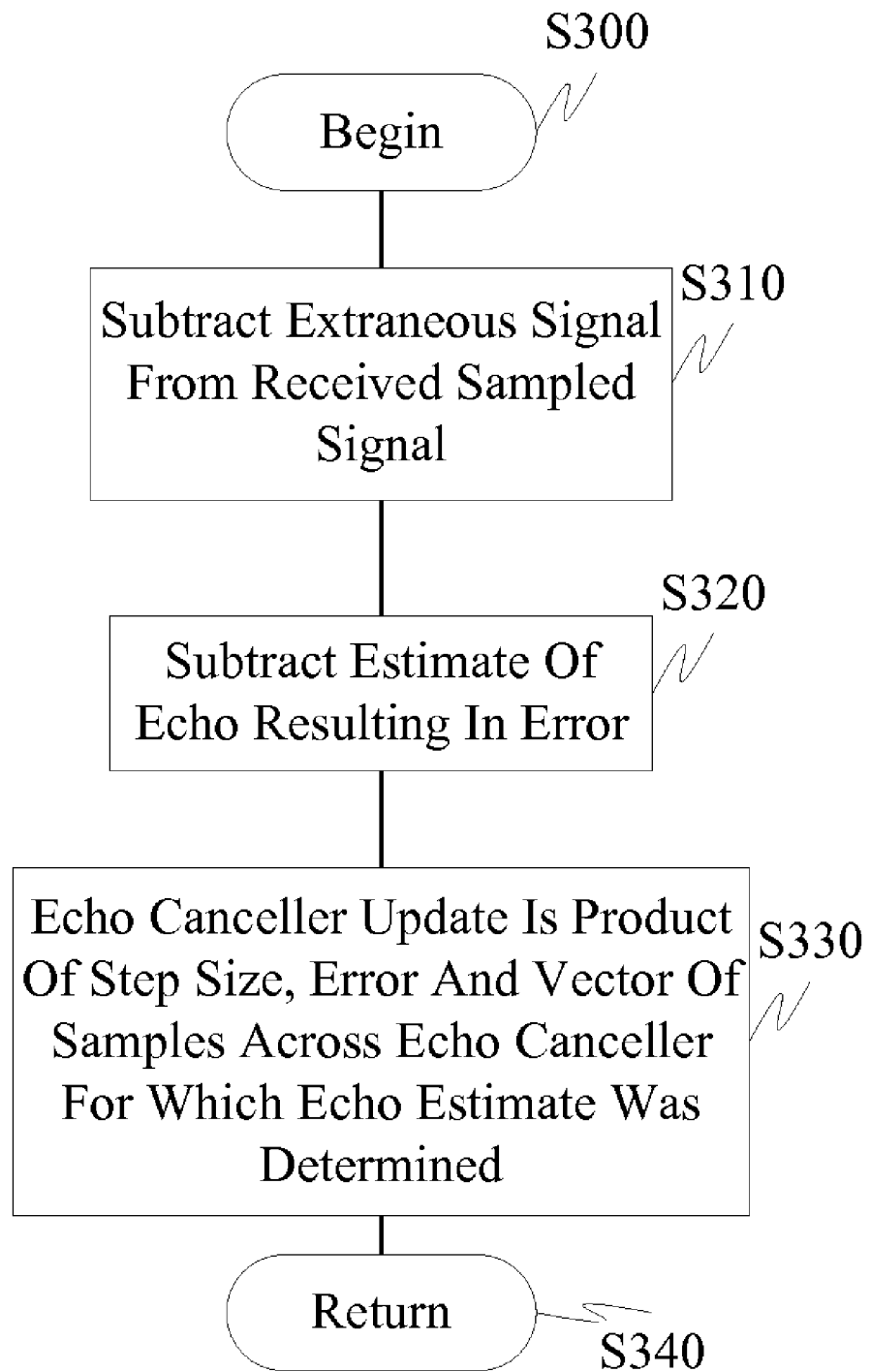
FIG. 3 is a flowchart outlining an exemplary method for determining the accuracy of an echo canceller according to this invention.

FIG. 3 illustrates an exemplary method of determining the accuracy of an echo canceller in accordance with one embodiment of the present invention. In particular, control begins in step S300 and continues to step S310. In step S310 the extraneous signal is extracted from the received sample signal. Next, in step S320, an estimate of the echo is subtracted from the extraneous signal resulting in an estimate of the error. Then, in step S330, an echo canceller update is determined based on the product of a step size, an error and a vector of samples across the echo canceller for which the echo estimate was determined Control then continues to step S340 where the control sequence ends.

As shown in FIG. 1, the echo cancellation system can be implemented either on a single program general purpose computer, a modem, such as a DSL modem, or a separate program general purpose computer having a communications device. However, the echo cancellation system can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like, and associated communications equipment. In general, any device capable of implementing a finite state machine that is capable of implementing the flowchart illustrated in FIGS. 2-3 can be used to implement an echo cancellation system according to this invention.

Furthermore, the disclosed method may be readily implemented in software using object or object-oriented software development environments that provide portable source code that can be used on a variety of computer, workstation, or modem hardware platforms. Alternatively, the disclosed echo cancellation system may be implemented partially or fully in hardware using standard logic circuits or a VLSI design. Other software or hardware can be used to implement the systems in accordance with this invention depending on the speed and/or efficiency requirements of the systems, the particular function, and a particular software or hardware systems or microprocessor or microcomputer systems being utilized. The echo cancellation system and methods illustrated herein however, can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor, or the like. In these instances, the methods and systems of this invention can be implemented as a program embedded in a modem, such a DSL modem, as a resource residing on a personal computer, as a routine embedded in a dedicated echo cancellation system, a central office, the CPE, or the like. The echo cancellation system can also be implemented by physically incorporating the system and method into a software and/or hardware system, such as a hardware and software systems of a modem, a general purpose computer, an ADSL line testing device, or the like.

It is, therefore, apparent that there is provided in accordance with the present invention, systems and methods for echo cancellation. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and the scope of this invention.

What is claimed is:

1. A system for updating an echo canceller in a multicarrier communication system comprising:
   means for receiving, in the multicarrier communication system, a plurality of sync frame signals (Rx), wherein each of the plurality of sync frame signals is a known far end signal with a known bit sequence;
   means for determining an average sync frame signal ($<Rx>$) by averaging the plurality of received sync frame signals (Rx); and
   means for determining a measured echo ($Echo_{measured,n}$) by subtracting the average sync frame signal ($<Rx>$) from a received sync frame ($Rx_n$).

2. The system of claim 1, wherein the means for determining the measured echo includes an ASIC.

3. The system of claim 1, wherein the means for determining the measured echo includes a digital signal processor.

4. A method of updating an echo canceller in multicarrier communication comprising:
   receiving, in the multicarrier communication system, a plurality of sync frame signals (Rx), wherein each of the plurality of sync frame signals is a known far end signal with a known bit sequence;
   determining, by a processor, an average sync frame signal ($<Rx>$) by averaging the plurality of received sync frame signals (Rx); and
   determining a measured echo ($Echo_{measured,n}$) by subtracting the average sync frame signal ($<Rx>$) from a received sync frame ($Rx_n$).

5. The method of claim 4, further comprising an ASIC.

6. The method of claim 4, further comprising a digital signal processor.

7. A system for updating an echo canceller in a multicarrier communication system comprising:
- a multicarrier modem that receives a plurality of sync frame signals (Rx), wherein each of the plurality of sync frame signals is a known far end signal with a known bit sequence; and
- an echo cancellation device, having a memory and controller, that determine an average sync frame signal ($<Rx>$) by averaging the plurality of received sync frame signals (Rx) and
- determine a measured echo ($Echo_{measured,n}$) by subtracting the average sync frame signal ($<Rx>$) from a received sync frame ($Rx_n$).

8. The system of claim 7, further comprising an ASIC.

9. The system of claim 7, further comprising a digital signal processor.

10. A non-transitory computer-readable information storage media having stored thereon instructions, that when executed by a processor, cause to be performed a method of updating an echo canceller in multicarrier communication comprising:
- receiving, in the multicarrier communication system, a plurality of sync frame signals (Rx), wherein each of the plurality of sync frame signals is a known far end signal with a known bit sequence;
- determining, by a processor, an average sync frame signal ($<Rx>$) by averaging the plurality of received sync frame signals (Rx); and
- determining a measured echo ($Echo_{measured,n}$) by subtracting the average sync frame signal ($<Rx>$) from a received sync frame ($Rx_n$).

* * * * *